Figure 1:
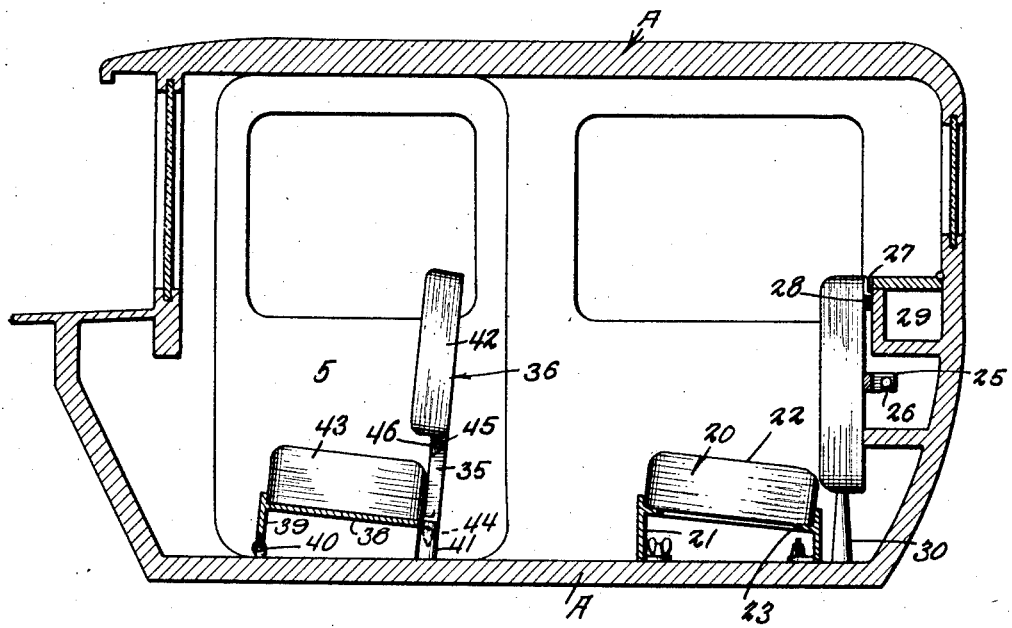

May 28, 1929.   J. L. RICHARDSON   1,715,308
AUTOMOBILE BED
Original Filed June 24, 1926   3 Sheets-Sheet 1

Joseph L. Richardson, Inventor

May 28, 1929.  J. L. RICHARDSON  1,715,308
AUTOMOBILE BED
Original Filed June 24, 1926   3 Sheets-Sheet 2
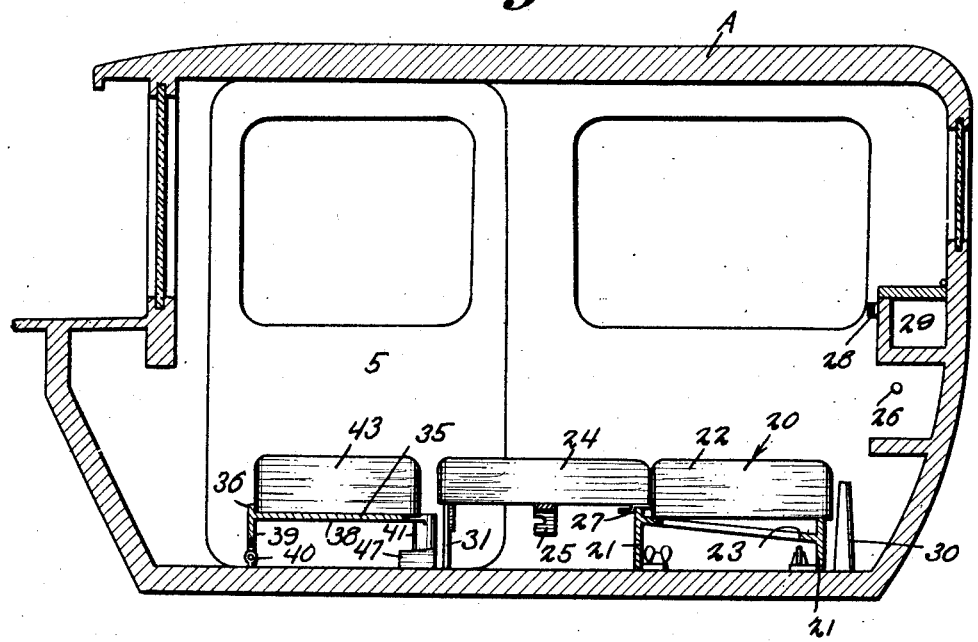
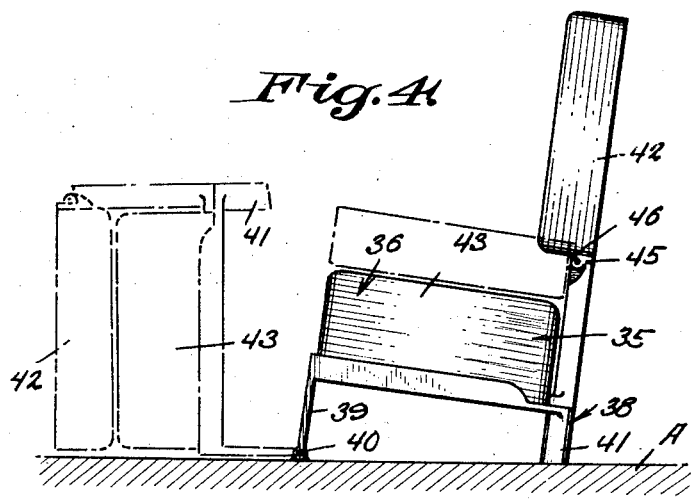
Joseph L. Richardson, Inventor
Witnesses
C. E. Churchman Jr.
By Richard B. Owen
Attorney

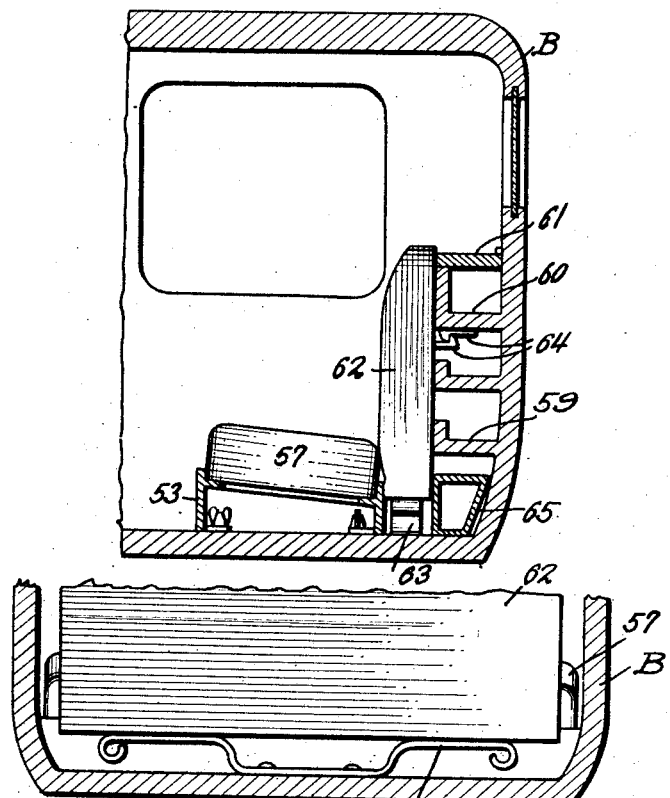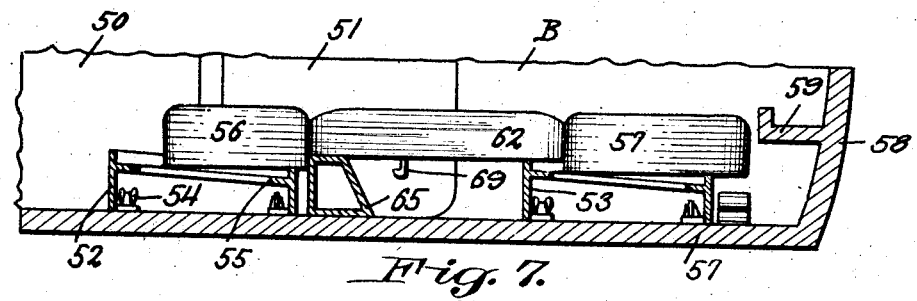

Patented May 28, 1929.

1,715,308

UNITED STATES PATENT OFFICE.

JOSEPH L. RICHARDSON, OF NASHVILLE, ARKANSAS.

AUTOMOBILE BED.

Original application filed June 24, 1926, Serial No. 118,288. Divided and this application filed May 17, 1927. Serial No. 192,092.

This invention relates to improvements in automobile beds and is a division from my copending application Serial No. 118,288, filed June 24, 1926.

The primary object of the present invention is to provide a novel front seat construction for automobiles of the coach type, whereby the seat can be readily manipulated to permit the free access from the front part of the body into the rear part and still perform its function of cooperation with the rear seat to form the bed.

Another object of the invention is to provide a front seat for automobile coach bodies including a pair of folding chair like structures connected with the floor of the vehicle and provided with removable backs, whereby the front seat can cooperate with the rear seat to form a horizontal bed bottom.

A further object of the invention is to provide a novel front seat for automobile coach bodies including a pair of chair like constructions, each of the same including removable backs, the backs being removable independent of one another, whereby the back of one seat can be left in position for the driver, and the back of the other seat removed, for cooperation with the rear seat to form a single bed.

A further object of the invention is to provide novel means for removably associating the seat back with the folding front seat of an automobile coach body, the means including supporting standards detachably connected with the seat and the seat back pivotally connected to the standards, whereby the seat back can be folded over the seat cushion when the seats are to be folded out of the way.

A further object of the invention is the provision of novel means for removably holding the back rest of the rear seat in position and novel means disposed in rear of said back rest and normally concealed thereby for receiving bed linen and the like.

A still further object of the invention is to provide an improved device of the above character, which will be durable and efficient in use, one that will be simple and easy to manufacture, and one which can be placed upon the market and incorporated with a conventional coach body at a small cost.

Figure 2:
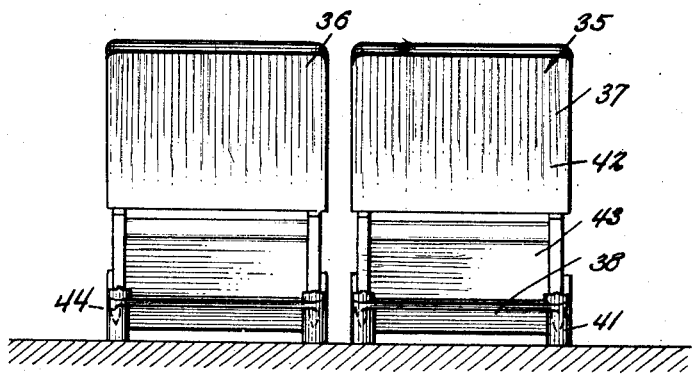

With these and other objects in view, the invention consists in the novel construction, arrangement and formation of parts, as will be hereinafter more specifically described, claimed, and illustrated in the accompanying drawings, in which drawings:

Figure 1 is a longitudinal section through an automobile of the coach type showing my improved seat construction, Figure 2 is an enlarged fragmentary transverse section through the coach body showing the improved front seat in rear elevation, Figure 3 is a view similar to Figure 1 showing the arrangement of the seats to form a horizontal bed bottom, and Figure 4 is a side elevation of one of the improved chairs for the front seat, the folded position of the chair being shown in dotted lines.

Figure 5 is a fragmentary longitudinal section showing a slightly modified form of the section with the rear seat and back rest in normal position, Figure 6 is a fragmentary transverse section through the vehicle showing the novel means employed for normally holding the back rest and rear seat in a raised position against movement, and Figure 7 is a fragmentary longitudinal section through an automobile showing the modified form of the invention and illustrating the arrangement of the seat cushions and back rest to form the bed.

Referring to the drawings in detail, wherein similar reference characters designate corresponding parts throughout the several views, the letter A generally indicates a motor vehicle body of the coach type having front and rear seats 35 and 20.

It is well known that vehicle bodies of the coach type are not provided with rear doors and that the passage to and from the rear seats through the front door is allowed by the provision of a pair of folding chair like structures which are disposed in side by side relation to cooperate for forming the complete front seat of the vehicle. The body is provided with an ordinary front door 5 as clearly shown in Figures 1 and 3 of the drawings and the front seat 35 is arranged at one side of the door while the rear seat is arranged in rear of the door in spaced relation to the front seat in the ordinary way.

The rear seat 20 embodies a relatively short or low built hollow supporting base 21 which is rigidly secured upon the floor of the vehicle body and is of such size as to extend from one side of the same to the other. A seat cushion 22 is removably supported by ledges or flanges 23 partially within the upper end of the supporting base 21 as clearly shown in Figure 1 of the drawings. The ledges 23 are arranged rearwardly and downwardly in relation so that the seat cushion 22 is normally supported in a rearwardly inclined position for insuring maximum comfort to the persons occupying the seats.

The rear seat also embodies a removable upholstered back rest 24 having rearwardly projecting hooks 25 carried by each end thereof. Fixed to each side of the vehicle body are headed pins 26 which are adapted to be engaged by the hooks 25 and it is apparent that when the hooks are in engagement with the pins that the back rest will be effectively held against forward shifting from operative position.

If preferred the back can also be provided with a fastener hook 27 for cooperating with a keeper 28 on the clothing compartment 29 carried by the body. Secured to the floor of the vehicle in back of the hollow supporting base 21 adjacent each side of the body are vertical pointed or tapered pins 30 which are adapted to fit within sockets formed in the lower portion of the rest 24 and these pins and sockets cooperate with the hooks 25 and pins 26 and fasteners 27 and 28 for holding the back rest in position. This arrangement however allows the convenient removal of the back cushion by simply pulling upward on the same and then forwardly.

The seat cushion 22 is adapted to be shifted rearwardly for engaging the rear upper edge of the base 21, so that the cushion 22 will be supported in a horizontal position when cooperating with the back rest 24 and the front seat, as will be later described, to form a horizontal bed bottom.

The front seat 35 embodies a pair of similar chair like structures 36 and 37 in side by side relation and as such chair like constructions are alike and of the same form, a description of one will suffice for both.

As shown each chair or chair construction includes a supporting base 38 having front supporting legs 39 hinged to the floor of the body of the vehicle as at 40 so that the chair may be swung from its normal or horizontal position forwardly and upwardly to a vertical forwardly shifted position. The base 38 is also provided with rear supporting legs 41 which merely contact with and rest upon the floor. As is usual in this type of construction each chair or chair construction has a hinged back rest 42 so that the same may be swung forwardly on the removable seat cushion 43.

In accordance with the present invention the back rest 42 is removable from the base 38 so that the complete back rest of each chair like construction may be removed for permitting the cushion 43 to cooperate with the cushion 22 and back rest 24 for forming a horizontal bed bottom as illustrated in Figure 3. For this purpose the rear supporting legs 41 are provided with sockets and attached to the lower edge of the back rest 42 of each chair adjacent the side of said back rest are standards provided at their lower ends with pins 44. The pins 44 are disposed to be removably inserted into the sockets of the legs 41 so that the back rest 42 is removably attached to the base 38 and the upper ends of the pins 44 are hinged as at 45 to depending brackets 46 on the lower edge of the back rest 42, whereby the latter may be swung forwardly and downwardly on to the cushion 43 as mentioned above.

With this construction it is apparent that the back rest 24 may be disposed as shown in Figure 3 after the back rest 42 has been removed which will form a complete horizontal bed. The back rest 24 when in its horizontal position rests upon legs 31 at its front end, which are hingedly connected thereto, and, at its rear side on the front edge of the seat base 21.

By this arrangement the seat back 42 of the chair 36 can be left in position if desired while the back rest 24 is being used in a horizontal plane which will form a small child's bed. When a full length bed is to be made the back 42 is removed and base 38 is swung up to an elevated horizontal position and held in such position by the use of blocks 47 which are placed under the rear legs 41. In this instance, the cushion 43 can be pushed back in engagement with the back 24.

In Figures 5 to 6 inclusive I have shown a slightly modified form of my invention.

In the present instance, the invention has been shown applied to a vehicle body of the sedan type which is indicated by the reference character B and this body includes the usual front and rear doors 50 and 51. Front and rear seat bases 52 and 53 are bolted or otherwise secured as at 54 to the floor of the vehicle B. Each of the seat bases 52 and 53 include ledges 55 disposed in an inclined plane, for the front and rear seat cushions 56 and 57. These seat cushions 56 and 57 are normally arranged in an inclined plane, when in operative position for usual seating purposes. The rear seat base 53 is spaced from the rear wall 58 of the body B and this wall 58 can be provided with transversely extending shelves 59 for the support of articles, such as bed linen or the like. Directly above the shelves 59 is arranged a compartment 60, which can be provided with a hinged cover 61. Any desired type of fastener can be provided for this cover.

When the rear seat cushion 57 is in its normal position, the back rest 62 is placed directly in front of the shelves 59 and the compartment 60, which can also be used for carrying various articles.

A transversely extending leaf spring 63 having elevated end portions is bolted or otherwise secured to the floor of the car and normally supports the back rest 62 yieldably in a raised position. The seat back 62 and the compartment 60 carry companion latch members 64, which are adapted to engage one another when the back rest 62 is held in a raised position by the leaf spring 63. Forward movement of the back rest 62 is of course prevented by the inter-engagement of the companion latch members 64.

When it is desired to remove the back rest 62 of the rear seat, it is merely necessary to push down on the back rest 62 against the tension of the elevated end portions of the leaf spring 63, which will disengage the companion portions 64 of the latch and upon forward swinging movement of the back rest, the same can be readily removed.

This back rest 62 forms a part of the bed, when the same is removed and a support 65 is used for this purpose. This support can be of hollow metal construction if preferred and is normally arranged below the lowermost shelf 59 in rear of the back 62 when the same is in its normal position.

When the seats are to be used as a bed, the seat cushions 56 and 57 are slid rearwardly as shown in Figure 7 so that the front edges thereof rest upon the inclined ledges 55 and their rear edges upon the upper edges of the rear members of the bases.

The support 65 is disposed with its widest face downward and directly in rear of the front seat base 52 and forms a support for the front portion of the back 62 which is disposed upon the same. The rear end of the seat back 62 is placed upon the front edge of the rear seat base 53. This forms a complete bed.

When the rear back rest 62 is in normal position, the shelves 59 and the compartment 60 are completely concealed from view, but when the back rest 62 is removed, the clothes can readily be removed from the shelves 59.

It is obvious that any desired type of latch or fastener can be used to hold the rear back rest 62 in normal position and that I have only illustrated a conventional form of latch for that purpose.

From the foregoing description, it is believed that the construction and operation as well as the advantages of the present invention will be readily understood and appreciated by those skilled in the art.

Minor changes may be made without departing from the spirit or scope of this invention, but:

What I claim as new is:

1. An automobile seat construction comprising a supporting base having front supporting legs adapted to be hinged at their lower ends upon the automobile floor, whereby the seat may be swung upwardly and forwardly to a vertical non-supporting position, said base having rear supporting legs formed with vertical sockets, and a back rest member having pins hinged to the lower edge thereof for permitting the back rest member to swing forwardly and downwardly on the base, said pins being removably engageable in said sockets to permit detachment of the back rest member from the base.

2. An automobile seat construction comprising a supporting base, legs supporting the rear side of the base and having sockets in their upper ends, a back rest, standards hingedly connected with the back rest, means limiting the swing of the back rest relative to the standards, the standards having end portions removably fitted in said sockets.

3. In a convertible seat structure for automobiles, a seat structure including a base, means hingedly connecting the base at its lower forward side with the floor of the automobile for forward and upward swinging movement to non-supporting position, a seat bottom on said base, legs supporting the base at the rear side thereof and provided with sockets in their ends, a back rest, standards having portions removably fitted in said sockets, and hinged connection between the standards and back rest to provide for forward and downward swinging of the back rest to position upon the seat bottom when the standards are engaged with said sockets.

In testimony whereof I affix my signature.

JOSEPH L. RICHARDSON.